March 17, 1970   H. HEFFINGTON   3,501,168
TRAILER SAFETY HITCH

Filed Sept. 20, 1968   2 Sheets-Sheet 1

INVENTOR:

HAMPTON HEFFINGTON

Richards, Harris & Hubbard

ATTORNEY

INVENTOR:
HAMPTON HEFFINGTON

ATTORNEY 3,501,168
Patented Mar. 17, 1970

3,501,168
TRAILER SAFETY HITCH
Hampton Heffington, 2808 Blanton St.,
Dallas, Tex. 75227
Filed Sept. 20, 1968, Ser. No. 761,207
Int. Cl. B60d 1/16
U.S. Cl. 280—457                               10 Claims

ABSTRACT OF THE DISCLOSURE

A safety hitch transmits pulling forces between a towing vehicle and a trailer should the primary coupling fail for any reason. A hook-shaped member attached to the towing vehicle section of the primary coupling and an eye-shaped member attaches to the trailer towing bar. These two members are interconnected by a coupling ring which is retained in place in the hook member by means of a spring latch.

BACKGROUND OF THE INVENTION

This invention relates to trailer safety hitches, and more particularly to a trailer safety hitch which substantially retains the normal pulling relationship between a towing vehicle and a trailer upon a failure in the primary coupling.

Heretofore, backup systems for primary trailer couplings usually consisted of one or more chains, or an arrangement of interconnected chains, connected between the towing bar of a trailer and the towing vehicle. Upon a failure in the primary coupling, the function of the safety chain is to transmit the pulling force of the towing vehicle to the trailer. There are a number of shortcomings to the safety chain. First, when the primary coupling fails, the trailer can "whip" since the chain permits considerable movement for the trailer towing bar. If the primary coupling fails in a downgrade, the trailer has a tendency, in many cases, to overrun the towing vehicle. In either of the above situations, the erratic action of the trailer has been known to overturn the towing vehicle.

Several attempts have been made to provide trailer safety hitches which overcome the shortcomings of the safety chain. One such attempt includes a hook-shaped member which has to be threaded through small openings in the primary coupling. The hook member is then bolted in place. This may or may not require the use of tools to connect the safety device. Unfortunately, when a safety device requires complicated connection procedures, the trailer user "forgets" to connect up the coupling. Other trailer safety devices have been proposed which require extensive modification or special primary couplings. These devices have not been accepted because of the cost of converting present primary coupling devices. An object of the present invention is to provide a trailer safety hitch that substantially retains the normal alignment of a trailer towing bar with a towing vehicle upon a failure of the primary trailer coupling. Another object of the present invention is to provide a trailer safety hitch compatible with presently available primary trailer couplings. Still another object of the present invention is to provide a trailer safety hitch that may be engaged with a minimum of effort. A further object of the present invention is to provide a trailer safety hitch that substantially reduces the chance of a trailer over-running a towing vehicle as a result of a failure of a primary trailer coupling.

In accordance with the present invention, a hook member is attached to the towing vehicle section of a primary trailer coupling below the primary coupling. This hook member terminates at approximately the connecting point between the vehicle section and the trailer section of the primary coupling. An eye member is attached to the towing bar of the trailer and includes a coupling ring that may be engaged with the hook member in a manner such that trailer-pulling forces are normally transmitted through the primary coupling. However, upon a failure of the primary coupling, the hook and eye members transmit the trailer-pulling forces and maintain substantially the normal relationship between a towing vehicle and a trailer.

A more complete understanding of the invention and its advantages will be apparent from the specification and claims and from the accompanying drawings illustrative of the invention.

DESCRIPTION OF PREFERRED EMBODIMENTS

Figure 1:
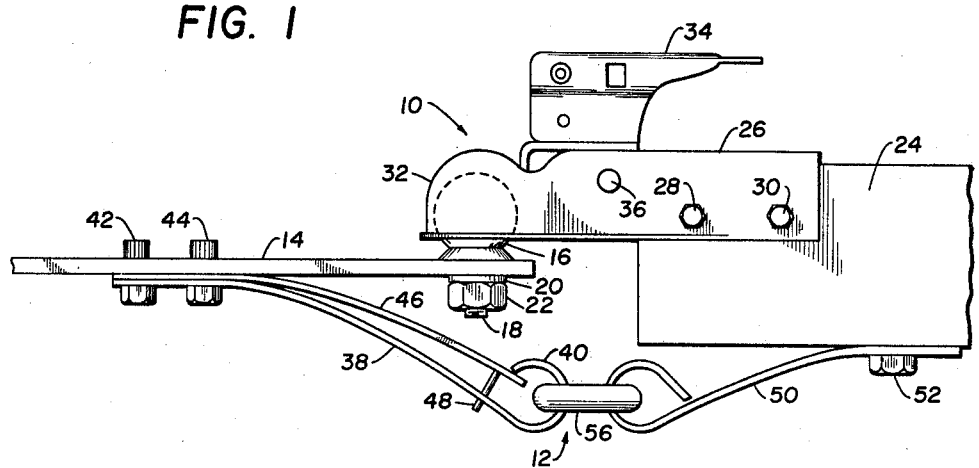
FIGURE 1 is a side view of a preferred embodiment of the safety hitch of the present invention illustrating its compatibility with commonly available primary trailer couplings.
Figure 2:
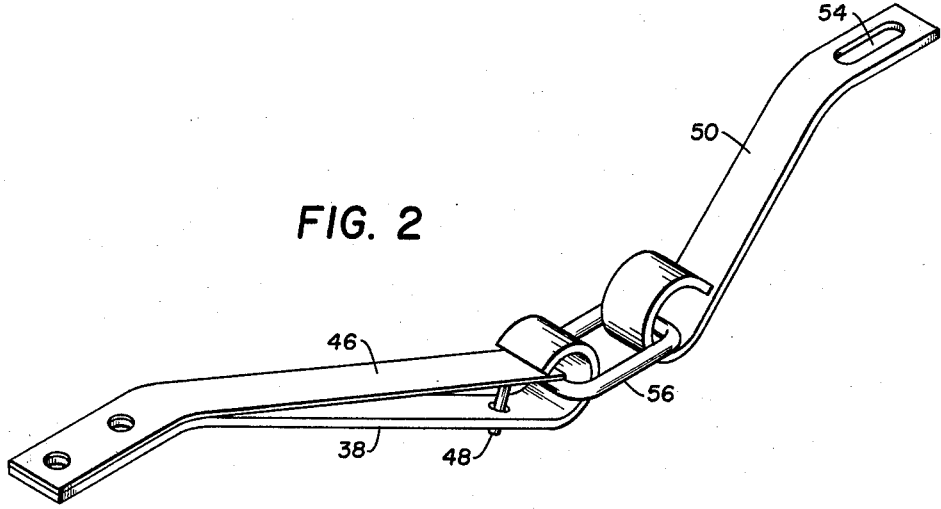
FIGURE 2 is an isometric view of the safety hitch of FIGURE 1 showing the two members joined by a couling ring.

Referring to FIGURES 1 and 2, there is shown a primary trailer coupling indicated generally by the reference numeral 10 and a backup safety hitch in accordance with the present invention indicated generally by the reference numeral 12. The primary trailer coupling 10 includes a pull bar 14 fastened to a towing vehicle (not shown) either to the rear bumper or the vehicle frame. Pull bars in common use today are either straight, as illustrated, or have a slight upward rise. The latter being used for automobile couplings and the former generally used with fractional tonnage trucks. As will be evident, the safety hitch of the present invention is compatible with both straight and curved pull bars.

In the usual manner, a ball 16 is provided in the pull bar 14 and comprises a part of a conventional primary hitch. The ball has the usual stem 18 extending through the pull bar 14 and is provided with a lock washer 20 and secured in position by means of a nut 22.

A trailer tongue, generally indicated at 24, has a bracket 26 attached to the end thereof by means of bolts 28 and 30. An arcuate ball socket 32 is formed at the end of the bracket 26 and engages the ball 16 to provide a primary coupling for transmitting forces from a towing vehicle to a trailer (not shown) through the tongue 24. A lever mechanism 34 is pivoted about a shaft 36 in the bracket 26 and includes a latch (not shown) to retain the ball 16 and the socket 32 in a coupling arrangement.

A number of variations of the lever mechanism 34 are commercially available; however, the basic purpose of retaining the socket 32 in engagement with the ball 16 is common to all available mechanisms. The ball 16, on the other hand, has become a fairly standard device for providing a pivotal couple between a towing vehicle and a trailer. In the normal towing situation, a ball and socket coupling have proven to provide a simple, inexpensive, and reliable coupling. It is, of course, understandable that under certain conditions this primary coupling may fail, releasing the trailer from the towing vehicle.

When a failure of the primary coupling system does occur, the trailer safety hitch generally indicated at 12 takes over the function of transmitting pulling forces from the towing vehicle to the trailer. The safety hitch includes a first hook member 38 having an open ended hook 40 at one end and attached to the pull bar 14 at the other end by means of bolts 42 and 44. Although illustrated as attached to a straight pull bar, the hook member 38 may be attached to pull bars of any configuration. Further, the hook member 38 may also be provided with a bracket to attach to the vehicle frame or bumper where a particular pull bar configuration does not permit attachment thereto.

Also attached to the pull bar 14 by means of the bolts 42 and 44 is a spring latch 46 which extends to and engages the open ended hook 40. Permanently affixed to the spring latch 46 at the hook 40 is a retaining pin 48. This pin extends through a passage in the hook member 38. The purpose and function of the spring latch 46 and the retaining pin 48 will be explained shortly.

An eye member 50 also makes up part of the safety hitch of the present invention and attaches to the trailer tongue 24 by means of a bolt 52 passing through a slot 54. The slot 54 enables the positioning of the eye member 52 with respect to the hook member 38 to compensate for variations in length of the primary coupling. A coupling ring 56 is permanently carried by the eye member 50 in the manner illustrated. The correct position of the eye member 50 with respect to the hook member 38 is such that the coupling ring 56 just passes the hook 40 when being engaged therewith.

To interconnect a trailer and a towing vehicle with the system illustrated in FIGURE 1, the primary coupling 10 is assembled in the usual manner without regard to the safety hitch 12. Since the safety hitch 12 does not comprise a part of or modify the primary coupling 10, it may be used with many of the standard ball socket couplings available today without modification thereto. After the primary coupling has been assembled, the coupling ring 56 is placed in engagement with the hook 40 by pressing against the spring latch 46. Note, only a simple assembly is required and tools or special wrenches are not needed.

Should a failure of the primary coupling occur, the coupling ring 56 along with the hook member 38 and the eye member 50 serve to hold the pull bar 14 and the trailer tongue 24 in approximately the same relationship as established by the primary coupling. The eye member 50 and the retaining pin 48 restrict the trailer tongue movement to a relatively small area which prevents the trailer tongue from falling and digging into the pavement and swaying from side to side, thus disaligning the trailer. In addition, it prevents the trailer from trying to overrun the towing vehicle.

By aligning the hook 40 at approximately the pivot axis of the ball 16 and the socket 32, the safety hitch of the present invention contributes little if any interference to the normal operation of the primary coupling. When the towing vehicle and trailer are maneuvering a curve, the socket 32 and the ball 16 rotate with respect to each other in a horizontal plane. This action will not be hindered by the safety hitch 12 since it also freely pivots in a horizontal plane. If the socket 32 pivots on the ball 16 in a vertical plane, a maneuver often encountered when pulling a trailer across a drainage ditch, the safety hitch 12 also freely pivots in a vertical plane. Thus, in addition to being compatible with conventional ball and socket couplings, the safety hitch of the present invention will not interfere with the normal operation of these conventional primary couplings.

Figure 3:
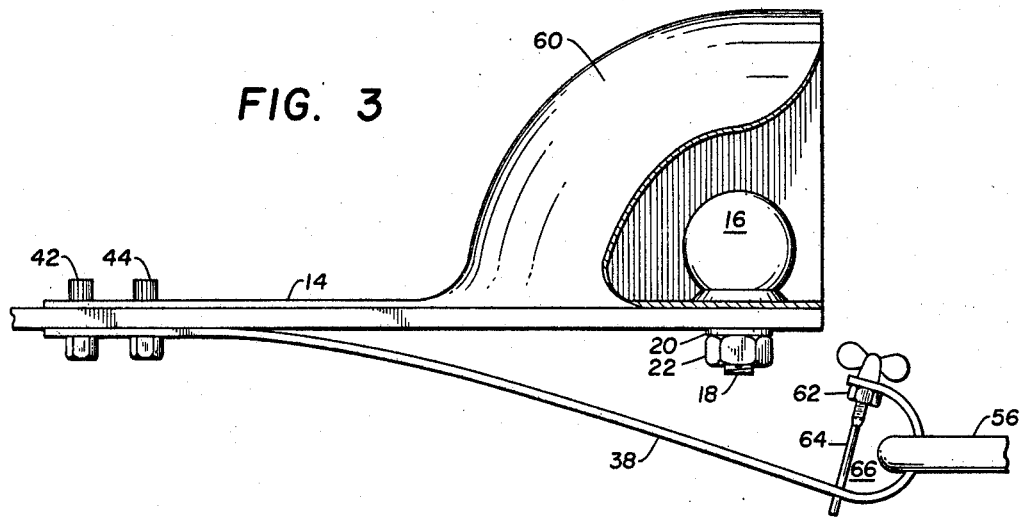
FIGURE 3 is an alternate embodiment of a safety trailer hitch in accordance with the present invention and illustrating a safety hood on the primary coupling.

Referring to FIGURE 3, there is shown a modification of the vehicle section of the primary and safety coupling of FIGURE 1. The same reference numerals are employed to identify similar parts. A pull bar 14 is adapted to be secured to a towing vehicle (not shown) in a conventional manner, and is provided with a ball 16 comprising a part of a conventional primary coupling. A shroud 60 in the shape of a half-sphere flattened at one end is attached to the pull bar 14 by means of bolts 42 and 44. This shroud extends to the end of the pull bar 14 such that the ball 16 is enclosed therein. Should the stem 18 shear off (a common failure for ball-socket couplings) or in any way become disengaged with the pull bar 14, the shroud 70 restricts the forward movement of the socket portion of the conventional primary coupling. This substantially reduces the chances of a trailer overrunning the towing vehicle on a downgrade.

Also illustrated in FIGURE 3 is a modification of the hook member of the trailer safety hitch 12. The hook member 38 is attached to the pull bar 14 with the bolts 42 and 44 and includes an open ended hook 40 having a threaded tab 62 secured to the end thereof. A retaining pin 64 having a threaded upper section extends through the tab 62 and an aperture in the member 38 thus forming a loop 66 with the hook 40. A simple hand operation completes the coupling of the safety hitch with the embodiment shown in FIGURE 3.

Operationally, the embodiment of FIGURE 3 is similar to that of FIGURE 1. The coupling ring 56 is retained in the area 66 to substantially maintain the alignment of the trailer tongue with the pull bar 14 upon a failure of the primary coupling.

Figure 4:
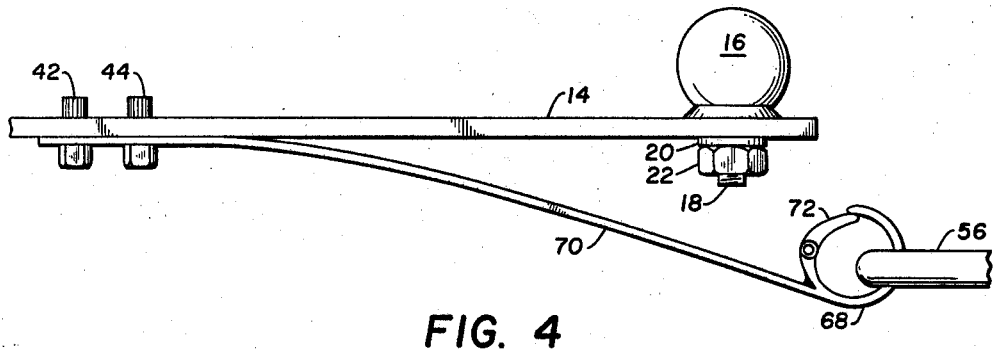
FIGURE 4 illustrates still another embodiment of the present invention.

Referring to FIGURE 4, there is shown another embodiment of the trailer safety hitch of the present invention. A bar 70, fastened to the pull bar 14 by means of bolts 42 and 44, includes a ring 68 attached to the free end. The ring 68 includes a spring-loaded latch 72 as a gate to permit engagement with the ring. The latch 72 is spring-loaded into the position shown. To engage the coupling ring 56 with the ring 68 requires a simple motion to depress the latch 72. Again, the coupling ring 56, working in conjunction with the ring 68 and the eye bar 50, maintains the trailer tongue in substantially the same alignment with the pull bar 14 as was established by the primary coupling.

While several embodiments of the invention, together with modifications thereof, have been described in detail herein and shown in the accompanying drawings, it will be evident that various further modifications are possible in the arrangement and construction of its components without departing from the scope of the invention.

What is claimed is:

1. A trailer safety hitch for use as a backup for a primary coupling having a towing vehicle section and a trailer section comprising:
   a hook member attached to the towing vehicle section of said primary coupling and terminating at approximately the connecting point between the vehicle section and the trailer section, and
   an eye member attached to the trailer section and including a coupling ring for engaging said hook member in a manner such that trailer-pulling forces are normally transmitted by the primary coupling with such forces being transmitted by the hook and eye members upon failure of the primary coupling.

2. A trailer safety hitch for use as a backup for a primary coupling having a towing vehicle section and a trailer section as set forth in claim 1 including a spring latch forming a closure with said hook member to retain said coupling ring in engagement therewith.

3. A trailer safety hitch for use as a backup for a primary coupling having a towing vehicle section and a trailer section as set forth in claim 2 including a retaining pin attached to said spring loaded latch and passing through an aperture in said hook member to restrict the movement of said eye member.

4. A trailer safety hitch for use as a backup for a primary coupling having a towing vehicle section and a trailer section as set forth in claim 1 including a retaining pin threaded through said hook member at one end and forming a closure therewith to retain said eye member when engaging said hook member.

5. A trailer safety hitch for use as a backup for a primary coupling having a towing vehicle section and a trailer section as set forth in claim 1 including a hood partially enclosing the towing vehicle section of said primary coupling to limit the movement of the trailer section upon a failure of the primary coupling.

6. A trailer safety hitch for use as a backup for a primary coupling having a towing vehicle section and a trailer section as set forth in claim 1 wherein said hook member includes a ring having a spring loaded latch closing an opening therein attached to the end of a bar fastened to the towing vehicle section.

7. A trailer safety hitch for use as a backup for a primary coupling having a towing vehicle section and a trailer section comprising:
- a hook member attached to the primary coupling at the towing vehicle extending below said primary coupling and terminating at approximately the connecting point between the vehicle section and the trailer section,
- a spring latch forming a closure with said hook member and attached to the primary coupling therewith,
- an eye member attached to the tongue of a trailer extending below said tongue and terminating in alignment with and spaced from said hook member, and
- a coupling ring carried by said eye member for engaging said hook member in a manner such that trailer-pulling forces are normally transmitted by the primary coupling except that such forces will be transmitted through said hook and eye members by means of said coupling ring upon a failure of the primary coupling.

8. A trailer safety hitch for use as a backup for a primary coupling having a towing vehicle section and a trailer section as set forth in claim 7 including a retaining pin attached to said spring loaded latch and passing through an aperture in said hook member to restrict the movement of said eye member.

9. A trailer safety hitch for use as a backup for a primary coupling having a towing vehicle section and a trailer section as set forth in claim 7 wherein the pivot point of the coupling ring when engaged with the hook member approximately corresponds to the pivot point of said primary coupling.

10. A trailer safety hitch for use as a backup for a primary coupling having a towing vehicle section and a trailer section as set forth in claim 9 including a hood partially enclosing the towing vehicle section of the main coupling to limit the movement of the trailer section upon a failure in the primary coupling.

References Cited

UNITED STATES PATENTS

| | | | |
|---|---|---|---|
| 1,557,806 | 10/1925 | Couts | 280—480 |
| 2,151,920 | 3/1939 | Jandus et al. | 280—501 |
| 2,251,656 | 8/1941 | Botelho | 280—457 |
| 2,650,101 | 8/1953 | Frankfother | 280—457 |
| 2,689,750 | 9/1954 | Van Horn | 280—457 |
| 2,738,206 | 3/1956 | Loughner | 280—461 |

LEO FRIAGLIA, Primary Examiner

U.S. Cl. X.R.

280—461, 501